April 21, 1970   R. E. WEBER ETAL   3,507,691
HEAT FORMABLE ARTIFICIAL LEATHER PRODUCT AND
METHOD OF MANUFACTURE
Filed Nov. 22, 1966
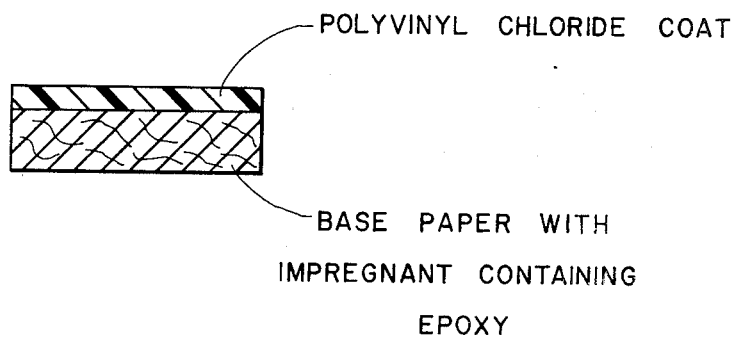
POLYVINYL CHLORIDE COAT
BASE PAPER WITH
IMPREGNANT CONTAINING
EPOXY

United States Patent Office 3,507,691
Patented Apr. 21, 1970

3,507,691
HEAT FORMABLE ARTIFICIAL LEATHER PRODUCT AND METHOD OF MANUFACTURE
Robert E. Weber, Neenah, Wis., and Marvin L. Dull, Munising, Mich., assignors to Kimberly-Clark Corporation, Neenah, Wis., a corporation of Delaware
Filed Nov. 22, 1966, Ser. No. 596,110
Int. Cl. B05c 3/12
U.S. Cl. 117—155         1 Claim

ABSTRACT OF THE DISCLOSURE

A cellulosic product in the from of an impregnated paper sheet having as a major impregnant an elastomer of nitrile rubber and including a small quantity of an epoxy resin. The effect of the epoxy resin incorporated in the product is to overcome a tendency of the nitrile rubber impregnated paper material to rupture when heat embossed. The specific product and the methods of attaining it are described.

---

This present invention is directed to improvements in the art of manufacture of cellulosic fiber webs impregnated with elastomeric materials. More specifically, the invention is concerned with elastomer impregnated paper webs which are of improved heat formable characteristics.

The impregnation of cellulosic products with elastomeric materials is well-known and is disclosed, for example, in United States Patent 3,019,134 issued Jan. 30, 1962, Hechtman and Greenman inventors, and assigned to the same assignee as the present invention. The impregnated sheets of that patent have utility in a number of types of products. Such include artificial leather materials and the like wherein the material is frequently subjected to hot embossing or similar procedures. In many instances the demands on the material are severe and as the contours formed in embossing have become deeper and more sharply formed, to satisfy the esthetic demands of the trade, rejects have tended to increase. Such are sometimes caused by a splitting of the impregnated web materials during the heat forming operation.

We have found that the tendency of elastomer impregnated sheets, wherein the elastomer is a nitrile rubber, to rupture during web forming may be overcome. Importantly, our procedure overcomes the rupturing tendency while retaining other beneficial properties of the impregnated sheet, particularly trapezoidal tear, adhesion to coating materials such as the vinyls, and capacity for being embossed and retaining the embossment in sharp outline.

Basically, our procedure involves simply the addition to the impregnating composition of an epoxy resin. The quantity of resin for the purpose is quite small. Importantly, there does not appear to be any significant reaction involved between the nitrile rubber and the epoxy. In any event, there does not appear to be a reaction which alters the basic character of the impregnant directly to provide the solution of the rupturing problem. Rather, the action of the epoxy appears to be that of insuring a tight cure of the nitrile rubber while avoiding degradation reactions which would adversely affect tear and adhesion characteristics.

The nitrile rubber employed is preferably a butadiene-acrylonitrile copolymer. Most suitably, such copolymer has a butadiene content of 60–75% and 40–25% of acrylonitrile on a weight basis. This copolymer, like that of Patent No. 3,019,134, the subject matter of which is incorporated herein by reference, is characterized by a Mooney viscosity (ML–4) of about 60–85. This rubber is employed in emulsion form and the epoxy resin is added to it as an emulsion prior to the impregnation of the paper web.

The epoxy resin is preferably one which may be conveniently added to the nitrile rubber emulsion or dispersion. It is, therefore, most suitably of a low molecular weight and dispersible in water or emulsifiable. A range of formulations have been explored with various commercially available epoxy resins and up to about 5% of epoxy resin by weight based on 100 parts of the nitrile rubber (dry weight) seems to be most useful for the purpose. More than 5% is apparently not harmful but unnecessary and contributes to expense. Epoxy resins which serve the purpose well include a resinous material which is essentially a di-epoxide having the chemical composition

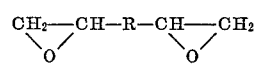

This is a colorless to pale liquid having a viscosity of about 90–150 centipoises at 25° C., a neutral pH and a gallon weight of about 10.2. It is marketed by Shell Chemical Corporation under the trademark "Eponite 100."

Additionally, resins of the formulation of

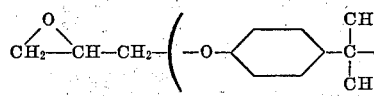 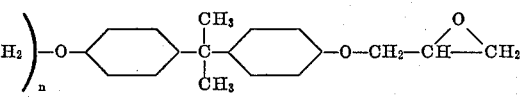

serve the purpose. The term $n$ in such formula may have a value of zero. One such resin has an epoxide equivalent of 185–192, a viscosity of 25° C. of 100–160 poises, and an average molecular weight of about 380. Such resin, for convenience, may be dispersed in a hydrocarbon solvent such as toluene, xylene, or the like preparatory to emulsion formation. Higher molecular weight resins also are conveniently dispersed in solvent prior to emulsifying.

The product illustrated in the single figure of the drawing is a lightly bonded sheet containing the impregnant and provided with a coating for use as an auto trim material. This product is formulated as now noted.

Example 1

A saturation grade base sheet in the form of loosely bonded cellulose fibers and having an apparent density of about 1.9 is saturated with saturant composition. This saturating composition is formed by a rubber latex emulsion containing about 70 parts by weight of butadiene, 30 parts by weight of acrylonitrile and a free radical curing agent such as dicumyl peroxide. This curing agent is present to the extent of ½ part by weight per 100 parts of rubber solids. The copolymer has a Mooney viscosity (ML–4) of about 60 to 85.

An epoxy emulsion is prepared by dispersing a low molecular weight epoxy in water together with about 5% by weight on the epoxy of "Tween 85," a polyoxyethylene sorbitan trioleate. The epoxy itself is the oil phase of this emulsion.

The epoxy emulsion is added to the nitrile latex to an extent to provide about 1 part by weight of the epoxy to 100 parts by weight of the butadiene acrylonitrile solids. The composition is agitated to procure a well mixed impregnant.

The saturation grade base sheet is impregnated by directing the sheet through a bath of the latex-epoxy composition. Following impregnation the sheet is dried at a temperature of about 200 to 225° F. on a heated drum or the usual drying equipment of the paper industry. On a dry basis the sheet contains about 70 parts by weight of impregnant per 100 parts of fiber.

The dried material is then cured. The curing procedure is to wind the impregnated sheet material while it is still hot from the drying process into a tight roll. The wound roll is then cured in an oven maintained at about 115° C.; the curing time is between about 12–16 hours. To stop the cure the impregnated paper is removed from the oven, unwound and passed over chill rolls to terminate the curing reaction. The curing imparts considerable toughness to the product so that it is tear resistant and will withstand severe twisting, for example. The material is useful as a shoe liner, for example, and is subject to embossing.

Importantly, the impregnated cured material is readily coated with thermoplastics such as polyvinyl chloride. A vinyl layer is, for example, calendered directly onto the impregnated material. For this purpose the calender rolls may be at a temperature of about 300–340° F. Following the calendering the polyvinyl coated material is directed to a series of cooling rolls. If desired, the coated impregnated material may be embossed on the vinyl coated side between the calender and cooling rolls. The cooled coated roll is directed from the cooling rolls to any suitable windup device.

The vinyl treated impregnated material may be further treated as by coating with lacquer to provide a lustrous sheet appearance.

More importantly, the coated and impregnaetd material may be hot embossed and is capable of taking a permanent set under the influence of pressure. Such impressioned materials have a particular utility as coverings, for examples, in simulation of leather in auto trim. Sharp contours and quilt-like impressions are readily accepted and retained by the product. The trim material of this invention is useful, for example, in the dielectric embossing method described in United States Patent 3,265,551 issued Aug. 9, 1966.

The inclusion of the epoxy most notably affects the product and procedure of hot embossing in that the epoxy inclusion inhibits splitting, tearing or separation of the impregnated sheet during the hot pressing. In the absence of the epoxy considerable breakage may occur during this press-forming. Importantly, the inclusion of the epoxy does not adversely affect the other physical properties desired in such material.

The property which the epoxy resin imparts to the impregnated paper we term "extensibility." This is for the reason that the sheet during hot forming may apparently extend sufficiently under the application of pressure and heat to avoid rupture. Thus, the sheet is useful for application to contoured backing supports where, under the influence of the heat and pressure, it will stretch to conform to the contours without splitting. Yet the sheet does not become significantly weakened, and it does retain embossments more suitably than in the absence of the epoxy. Consequently, sharp outlines are readily attained. The extensibility factor appears to be related to the tensile and stretch characteristics of the impregnated cured web. Tests indicate that too high a tensile at break and too low a stretch result in poor retention of embossment configuration. Too high a stretch at low tensile occasions premature rupture. Additionally, the extent of cure may be less while serving the purpose. Thus, it has been found that the cure as measured by Tensile-Energy-Absorption on an Instron tester at a rate of elongation of 4% per minute at 240° F. should have in units of inch-pounds per inch square a value of 0.20 for systems with the epoxy resin, whereas, for systems without the resin, a value of 0.33 or greater is needed. The lower cure level retains better edge tear, internal tear characteristics, flexibility and toughness for the purposes of decorative trim. In general, it aids in giving the proper balance of physical properties.

The formulation as illustrated is subject to considerable variation. As already noted, up to about 5%, that is, from about 1% to 5% on the weight of the rubber of the epoxy, does not appear to make a great difference in the result although the increased epoxy may permit some shortening of the cure.

The impregnant may include additional components for specific purposes: methyl cellulose between about 1 to 5% on the weight of the rubber to aid viscosity of the composition on the saturating machines; between about 0.5 to 3% soap to effect emulsion stability control.

The impregnant may suitably be present to the extent of between about 30 to 150 parts by weight per 100 parts of fiber. A range of about 60 to 100 parts is preferable for material which is to be deeply embossed.

The following additional specific examples particularly illustrate a range of the epoxy resins (both liquid and solid at normal temperatures) to be useful in the practice of the invention.

Example 2

A nitrile rubber emulsion as in Example 1 having a solids content of about 41% contained on a dry basis 420 parts by weight of copolymer and 2.1 parts by weight of dicumyl peroxide as curing agent. The epoxy emulsion contained by weight: 4.2 parts of resin having an epoxide equivalent of about 185 to 192 and an average molecular weight of about 380 dispersed in about 13.5 parts of toluene as the disperse phase; one part of polyoxyethylene sorbitan trioleate as emulsifying agent was added to 50 parts of water which constituted the continuous phase. This second emulsion was then combined with the first to provide one part by weight of the epoxy to 100 parts of the copolymer.

Measurements after saturation of a low bonded base sheet, as in Example 1, indicated pickup on a dry basis of about 73 parts by weight of the saturant. This material was cured as in Example 1 and useful for the same purposes as there noted.

Example 3

Example 2 was repeated except that in this instance the epoxy emulsion had the following formulation:

| | Parts by wt. |
|---|---|
| Epoxy resin | 21 |
| Toluene | 68 |
| Polyoxyethylene sorbitan trioleate | 5 |
| Water | 150 |

This emulsion was added to the nitrile rubber emulsion to provide about 5 parts by weight of the epoxy per 100 parts of rubber. Saturation and curing took place as in Examples 1 and 2 and the results were about the same as in Examples 1 and 2.

Example 4

Example 2 was repeated except that the epoxy resin employed was a liquid having an epoxy equivalent between about 650 to 750. The results after saturation and curing were substantially as in Example 2.

Example 5

Example 3 was repeated except that the epoxy resin was a solid having a melting point of about 95 to 105° C. and an epoxide equivalent of about 875 to 1025. The results after saturation and curing were about the same as in Example 3.

As many apparently widely different embodiments of this invention may be made without departing from the spirit and scope thereof, it is to be understood that we do not limit ourselves to the specific embodiments thereof except as defined in the appended claims.

What is claimed is:

1. In a cellulosic product comprising a paper sheet of loosely bonded saturation grade cellulose fibers having, prior to saturation, an apparent density of about 1.0 to about 2.6 and a cured impregnating composition present to the extent of between about 30 to 150 parts by weight per 100 parts of fiber and containing a copolymer of butadiene-acrylonitrile in which the copolymer is present to between about 60–75% by weight of butadiene and 40–25% by weight of acrylonitrile, the polymer being characterized by a Mooney viscosity (ML-4) of about 60–85, the improvement which comprises the inclusion in said cured impregnant of about 1% to about 5% of an epoxy resin based on the weight of the copolymer, the epoxy resin being a low molecular weight resin, a liquid at 25° C. and having an epoxide equivalent of less than about 1000.

References Cited

UNITED STATES PATENTS

| | | | |
|---|---|---|---|
| 2,683,094 | 7/1954 | Jones et al. | 117—76 X |
| 2,838,890 | 6/1958 | McIntyre | 117—76 X |
| 2,947,338 | 8/1960 | Reid et al. | |
| 3,019,134 | 1/1962 | Hechtman et al. | 117—155 |
| 3,026,217 | 3/1962 | Hechtman et al. | 117—155 |
| 3,027,337 | 3/1962 | Tritsch | 117—161 X |
| 3,055,496 | 9/1962 | Dunlap | 162—168 X |
| 3,265,551 | 8/1966 | Ananian et al. | 156—219 |
| 3,308,007 | 3/1967 | Shepard | 117—76 X |
| 3,309,224 | 3/1967 | Weber | 117—155 |
| 3,345,204 | 10/1967 | Dunlap | 117—155 X |

FOREIGN PATENTS 788,381   1/1958   Great Britain.

WILLIAM D. MARTIN, Primary Examiner

M. R. LUSIGNAN, Assistant Examiner